(12) United States Patent
Bostrom (10) Patent No.: US 12,533,474 B2
(45) Date of Patent: Jan. 27, 2026

(54) TUBULAR ROTATOR

(71) Applicant: SHL MEDICAL AG, Zug (CH)

(72) Inventor: Anders Bostrom, Ingaro (SE)

(73) Assignee: SHL Medical AG, Zug (CH)

( * ) Notice: Subject to any disclaimer, the term of this patent is extended or adjusted under 35 U.S.C. 154(b) by 946 days.

(21) Appl. No.: 17/772,445

(22) PCT Filed: Oct. 8, 2020

(86) PCT No.: PCT/EP2020/078225
§ 371 (c)(1),
(2) Date: Apr. 27, 2022

(87) PCT Pub. No.: WO2021/089269
PCT Pub. Date: May 14, 2021

(65) Prior Publication Data
US 2022/0370726 A1 Nov. 24, 2022

(30) Foreign Application Priority Data
Nov. 8, 2019 (EP) .................................... 19207903

(51) Int. Cl.
*A61M 5/315* (2006.01)
*A61M 5/24* (2006.01)
(Continued)

(52) U.S. Cl.
CPC .......... *A61M 5/31586* (2013.01); *A61M 5/24* (2013.01); *A61M 5/3146* (2013.01);
(Continued)

(58) Field of Classification Search
CPC .. A61M 5/31586; A61M 5/24; A61M 5/3146; A61M 5/31533; A61M 5/31565;
(Continued)

(56) References Cited

U.S. PATENT DOCUMENTS 6,474,960 B1 11/2002 Hansmann
9,180,259 B2 11/2015 Lesch, Jr.
(Continued)

FOREIGN PATENT DOCUMENTS

| CN | 102917738 A | 2/2013 |
| CN | 110234387 A | 9/2019 |

(Continued)

OTHER PUBLICATIONS

International Search Report and Written Opinion for Int. App. No. PCT/EP2020/078225.

*Primary Examiner* — Tasnim Mehjabin Ahmed
(74) *Attorney, Agent, or Firm* — McDonnell Boehnen Hulbert & Berghoff LLP (57) ABSTRACT

A tubular rotator for a medicament delivery device is presented having a tubular body extending along a longitudinal axis and having a proximal end and a distal end. Mechanical members are arranged on the outer and inner surface of the tubular body and are configured to co-operate with corresponding mechanical members arranged on other parts of the medicament delivery device. A tubular resilient structure is integrally or fixedly arranged to the proximal end of the body that has a proximal contact surface configured to abut against a distal end surface of a medicament container arranged in the medicament delivery device.

18 Claims, 8 Drawing Sheets

(51) Int. Cl.
*A61M 5/31* (2006.01)
*A61M 5/32* (2006.01)

(52) U.S. Cl.
CPC .... *A61M 5/31533* (2013.01); *A61M 5/31565* (2013.01); *A61M 5/3232* (2013.01); *A61M 5/3234* (2013.01); *A61M 2005/2418* (2013.01)

(58) Field of Classification Search
CPC .............. A61M 5/3232; A61M 5/3234; A61M 2005/2418
See application file for complete search history.

(56) References Cited

U.S. PATENT DOCUMENTS

| | | |
|---|---|---|
| 2010/0185148 A1 | 7/2010 | Gillespie et al. |
| 2012/0283662 A1* | 11/2012 | MacDonald ....... A61M 5/31511 604/236 |
| 2013/0035642 A1* | 2/2013 | Daniel ................ A61M 5/3158 604/189 |
| 2013/0184655 A1 | 7/2013 | Lanzi et al. |
| 2013/0281927 A1 | 10/2013 | Jennings et al. |
| 2017/0348489 A1 | 12/2017 | Hirschel et al. |

FOREIGN PATENT DOCUMENTS

| | | |
|---|---|---|
| EP | 3184134 A1 | 6/2017 |
| EP | 3302630 A1 | 4/2018 |
| EP | 3302635 A1 | 4/2018 |
| JP | 2013-526904 A | 6/2013 |
| WO | 2007/129324 A2 | 11/2007 |
| WO | 2011/039226 A1 | 4/2011 |
| WO | 2011/123024 A1 | 10/2011 |
| WO | 2013016832 A1 | 2/2013 |
| WO | 2018/138327 A1 | 8/2018 |
| WO | 2019/137701 A1 | 7/2019 |

* cited by examiner

TUBULAR ROTATOR

CROSS REFERENCE TO RELATED APPLICATIONS

The present application is a U.S. National Phase application pursuant to 35 U.S.C. § 371 of International Application No. PCT/EP2020/078225 filed Oct. 8, 2020, which claims priority to European Patent Application No. 19207903.6 filed Nov. 8, 2019. The entire disclosure contents of these applications are herewith incorporated by reference into the present application.

TECHNICAL FIELD

The present application relates to a tubular rotator for a medicament delivery device specifically a tubular rotator with a resilient structure for a medicament container to hold the medicament container in a steady state inside a medicament delivery device.

BACKGROUND

Regarding medicament delivery devices having a medicament container assembled therein, it is often a desire that the medicament container is supported such that it may not rattle or move inside the housing of the medicament delivery device. Due to tolerance variations of both the medicament container and the medicament delivery device as such, any support for a medicament container should preferably be flexible and possibly also resilient in order to handle forces exerted on the medicament delivery device and thus the medicament container if it e.g. is dropped onto a hard surface.

The document WO 2011/123024 discloses a medicament delivery device provided with a number of automatic functions, which medicament delivery device has been very well received on the market. The medicament delivery device comprises a rotatable tubular operation member and a rear cap housing having a tubular extension part; the rotatable tubular operation member is configured to interact with the flexible tongue on tubular extension part of the rear cap housing through an inner groove arranged on its inner surface; and interact with a activation member through an outer groove arranged on its outer surface for controlling the activation of the medicament delivery device. The rear cap housing further comprises a protrusion configured to axially hold the rotatable tubular operation member in relation to the rear cap housing and the medicament delivery device and a support structure in the form of arc-shaped flexible elements that are to come in contact with a distal end surface of a medicament container placed in the medicament delivery device. The support structure then exerts a force in the proximal direction of the medicament container for preventing movement of the medicament container.

This solution works very well. However, there is still place for developing more robust solutions.

SUMMARY

The aim of the present disclosure is to obtain alternative and more robust solutions.

In the present disclosure, when the term "distal direction" is used, this refers to the direction pointing away from the dose delivery site during use of the medicament delivery device. When the term "distal part/end" is used, this refers to the part/end of the delivery device, or the parts/ends of the members thereof, which under use of the medicament delivery device is/are located furthest away from the dose delivery site. Correspondingly, when the term "proximal direction" is used, this refers to the direction pointing towards the dose delivery site during use of the medicament delivery device. When the term "proximal part/end" is used, this refers to the part/end of the delivery device, or the parts/ends of the members thereof, which under use of the medicament delivery device is/are located closest to the dose delivery site.

Further, the term "longitudinal", "longitudinally", "axially" or "axial" refer to a direction extending from the proximal end to the distal end, typically along the device or components thereof in the direction of the longest extension of the device and/or component.

Similarly, the terms "transverse", "transversal", "transversally" refer to a direction generally perpendicular to the longitudinal direction.

Moreover, the term "associated" or association" as used herein, includes but is not limited to direct and indirect attachment, adjacent to, in contact with, partially or fully attached to, and/or in close proximity therewith.

An object of this disclosure is to provide a simple and reliable way of axially holding a rotatable tubular operation member in relation to a housing of a medicament delivery device and supporting a medicament container in the medicament delivery device.

According to an aspect of the disclosure, the object is achieved by a robust and reliable tubular rotator according to claim 1.

There is hence provided a tubular rotator for a medicament delivery device, comprising: a tubular body extending along a longitudinal axis and having a proximal end and a distal end; mechanical members arranged on the outer and inner surface of the tubular body, wherein said mechanical members are configured to co-operate with corresponding mechanical members arranged on other parts of the medicament delivery device; and a tubular resilient structure integrally or fixedly arranged to the proximal end of the body, wherein said tubular resilient structure comprises a proximal contact surface configured to abut against a distal end surface of a medicament container arranged in the medicament delivery device.

According to one embodiment, the tubular rotator is configured to be rotatable in relation to the medicament container.

According to one embodiment, the tubular resilient structure is configured to either axially deform along a longitudinal axis of the tubular rotator or to radially deform in relation to a longitudinal axis of the tubular rotator, or a combination thereof.

According to one embodiment, the tubular resilient structure is formed by at least two flexible wings.

According to one embodiment, the at least two flexible wings are extending radially outward in relation to the longitudinal axis in the proximal direction of the tubular body.

According to one embodiment, the tubular resilient structure is formed as a web shape structure.

According to one embodiment, the tubular resilient structure is formed as a flexible arm, the flexible arm may extend along the longitudinal axis from the distal end of the tubular body; and a proximal portion of the flexible arm can be formed as an arc radially curved relative to the longitudinal axis.

According to one embodiment, the tubular resilient structure is a plastic spring, preferably, the plastic spring is in a form of a compression spring extending along the longitudinal axis.

According to one embodiment, the deformation of the tubular resilient structure is configured to compensate engineering tolerances of the medicament container during the medicament delivery device assembling.

According to one embodiment, the deformation of the tubular resilient structure is configured to dissipate a force exerted on the distal end surface of the medicament container.

According to one embodiment, the deformation of the tubular resilient structure is configured to axially support the tubular rotator in a predetermined position in relation to the medicament container.

According to one embodiment, the tubular rotator is used in a medicament delivery device.

According to one embodiment, the force exerted on the distal end surface of the medicament container is created during an auto penetration operation of the medicament delivery device.

According to one embodiment, the deformation of the tubular resilient structure is configured to axially support the tubular rotator in a predetermined position in relation to the medicament delivery device.

According to one embodiment, the medicament delivery device further comprises a telescoping delivery member cover which is one of the other parts of the medicament delivery device and wherein the telescoping delivery member cover comprises a distal guide element which is one of the corresponding mechanical members and which is configured to cooperate with the mechanical member arranged on the outer surface of the tubular body; such that a distal axial movement of the telescoping delivery member cover along the longitudinal axis forces the tubular rotator to rotate from a first rotation position to a second rotation position.

According to one embodiment, the medicament delivery device further comprises a housing configured to receive the tubular rotator and at least partially receive the delivery member cover.

According to one embodiment, the delivery member cover comprises a guide structure and the inner surface of the housing comprises a counter guide structure configured to interact with the guide structure, such that the rotation of the delivery member cover in relation to the housing of the delivery device is prevented.

According to one embodiment, the medicament delivery device further comprises a biased plunger rod which is one of the other parts of the medicament delivery device and wherein the biased plunger rod comprises an engaging element which is one of the corresponding mechanical members which is configured to be releasably engaged with a mechanical member on the inner surface of the tubular body when the tubular rotator is in the first rotation position, such that an axial movement of the biased plunger rod along the longitudinal axis is prevented.

According to one embodiment, the medicament delivery device further comprises a biased plunger rod and a rear cap housing having a flexible holding element which is associated with the biased plunger rod, and wherein the flexible holding element which is one of the corresponding mechanical members is configured to be releasably engaged with a mechanical member on the inner surface of the tubular body when the tubular rotator is in the first rotation position, such that an axial movement of the biased plunger rod along the longitudinal axis is prevented.

According to one embodiment, the medicament delivery device further comprises a longitudinal extending biased feedback element associated with the biased plunger rod; wherein the biased click element comprises a retaining member associated with an abutment of the tubular resilient structure of the tubular rotator when the tubular rotator is in the first rotation position; such that an axial movement of the biased feedback element in relation to the medicament delivery device is prevented.

According to one embodiment, the medicament delivery device further comprises a longitudinal extending biased feedback element associated with the biased plunger rod; wherein the biased click element comprises a retaining member associated with an abutment of the rear cap housing; such that an axial movement of the biased feedback element in relation to the medicament delivery device is prevented.

According to one embodiment, the biased feedback element is arranged between the inner surface of the tubular rotator and the outer surface of the biased plunger rod; and wherein the retaining member of the biased feedback element is configured to disengage from the tubular resilient structure of the tubular rotator when the outer surface of the biased plunger rod is no longer in contact with the biased feedback element.

According to one embodiment, the abutment of tubular resilient structure of the tubular rotator is configured to disengage from the biased feedback element when the tubular rotator is in the second rotation position.

According to one embodiment, the biased feedback element is arranged between the inner surface of the rear cap housing and the outer surface of the biased plunger rod; and wherein the retaining member of the biased feedback element is configured to disengage from the rear cap housing when the outer surface of the biased plunger rod is no longer in contact with the biased feedback element.

According to one embodiment, the biased feedback element is biased in the distal direction in relation to the housing of the medicament delivery device.

According to one embodiment, the biased feedback element is moved distally and interacting with a feedback generator arranged on the distal portion of the housing of the medicament delivery device, such that a feedback to a user of the medicament delivery device is generated.

According to one embodiment, the feedback generator is arranged on the inner surface of the distal end of the housing.

According to one embodiment, the feedback generator is arranged on the inner surface of the distal end of the rear cap housing.

According to one embodiment, the feedback generator is a separate element arranged on the distal part of the housing.

According to one embodiment, the feedback is an audible feedback, a tactile feedback, visual feedback or an electronic feedback signal.

According to one embodiment, the medicament delivery device further comprises a biasing element arranged between the biased plunger rod and the biased feedback element; wherein the biasing element is configured to bias the biased plunger rod in the proximal direction of the housing and bias the biased feedback element in the distal direction of the housing.

According to one embodiment, the biasing element can be a spring or a gas canister.

According to one embodiment, the medicament delivery device further comprises a medicament container and a rear cap housing having a ramp surface that is configured to contact with the distal end of the medicament container.

According to one embodiment, the contact between the ramp surface and the distal end of the medicament container is configured to align the rear cap housing with the medicament container during the medicament delivery device assembling and to prevent the medicament container from rattling.

According to one embodiment, the medicament delivery device further comprises a medicament container carrier and a damper element arranged between the medicament container carrier and a flange of the medicament; wherein the ramp surface of the rear cap housing is configured to bias the distal end of the medicament container; such that the damper element is thereby compressed.

According to one embodiment, the compression of damper element is configured to compensate engineering tolerances of the medicament container during the medicament delivery device assembling.

According to one embodiment, the compression of damper element is configured to dissipate a force transited to the flange of the medicament container.

According to one embodiment, the medicament delivery device can be an injection device, an on-body device, an inhalation device, a nasal sprayer or a medical sprayer.

Other aspects, features, and advantages will be apparent from the summary above, as well as from the description that follows, including the figures and the claims.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
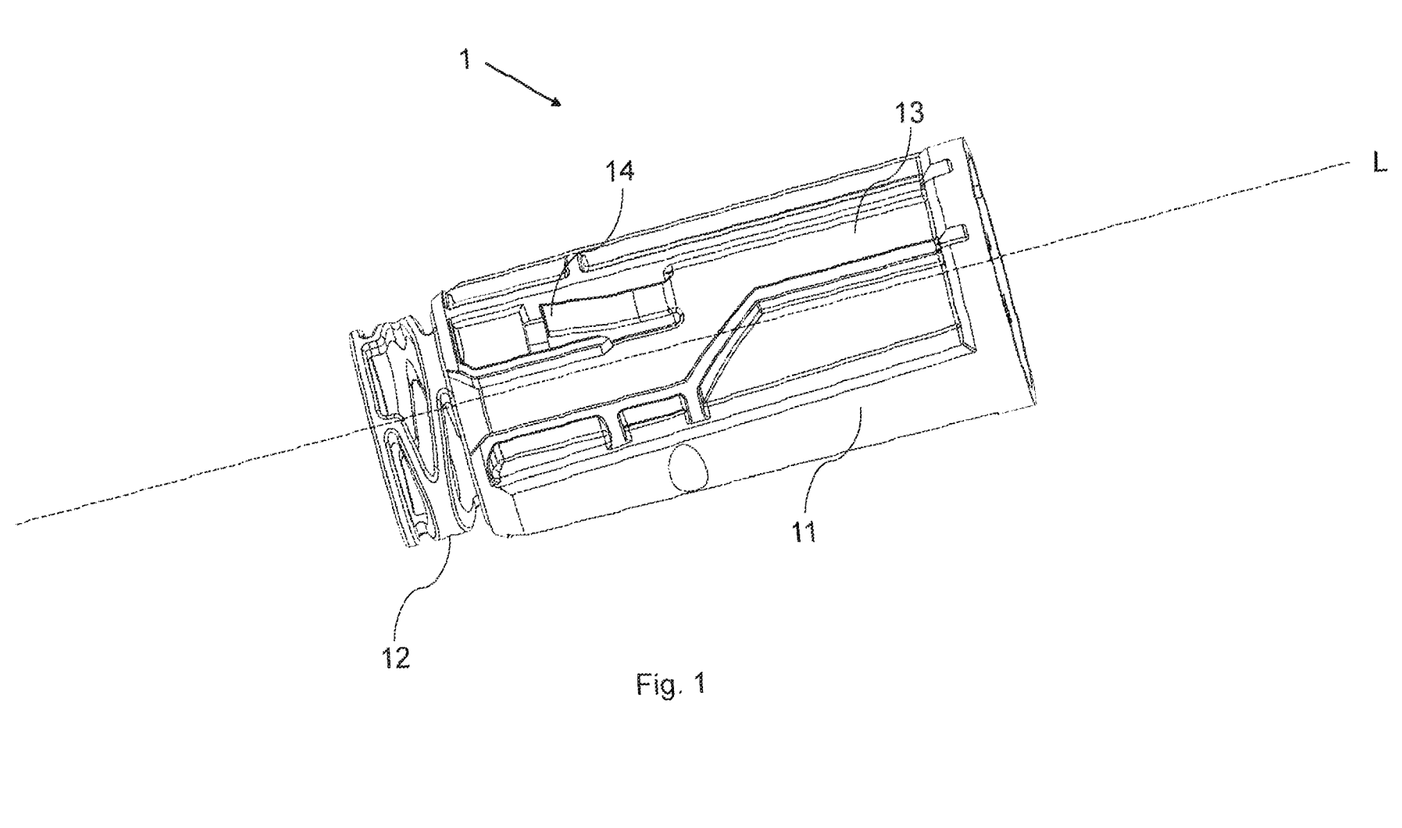
FIG. 1 displays a tubular rotator.
Figure 2:
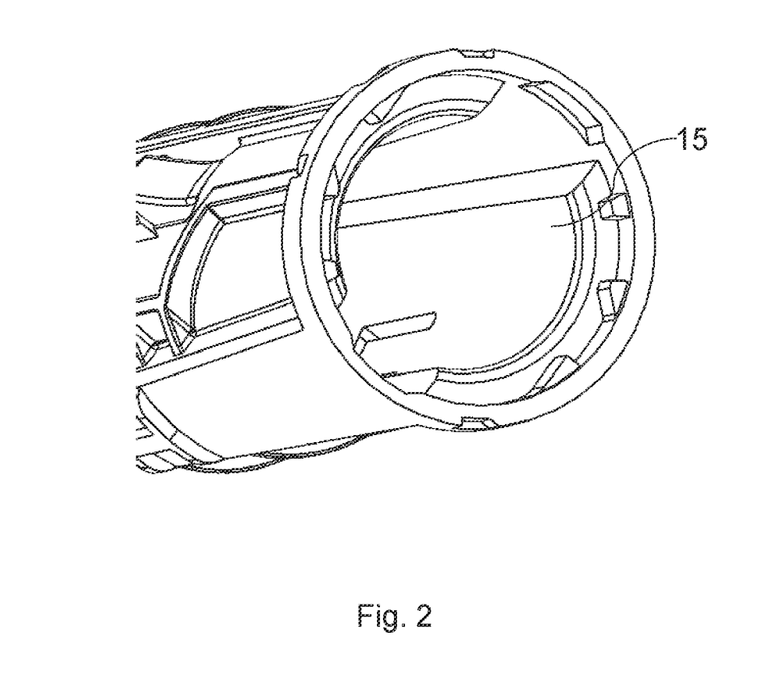
FIG. 2 displays an inner surface of the tubular rotator of FIG. 1 in a first embodiment.

FIG. 1 illustrates a tubular rotator comprising a tubular body 11 extending along a longitudinal axis L; a mechanical member on the outer surface of the tubular body 11, preferably being a guide track 13; another mechanical member on the inner surface of the tubular rotator body 11, preferably being a retaining wall 15 as shown in FIG. 2; a flexible locking tongue 14 arranged on the outer surface of the tubular body 11; and a tubular resilient structure 12 integrally or fixedly arranged to a proximal end of the tubular body 11.

Figure 3:
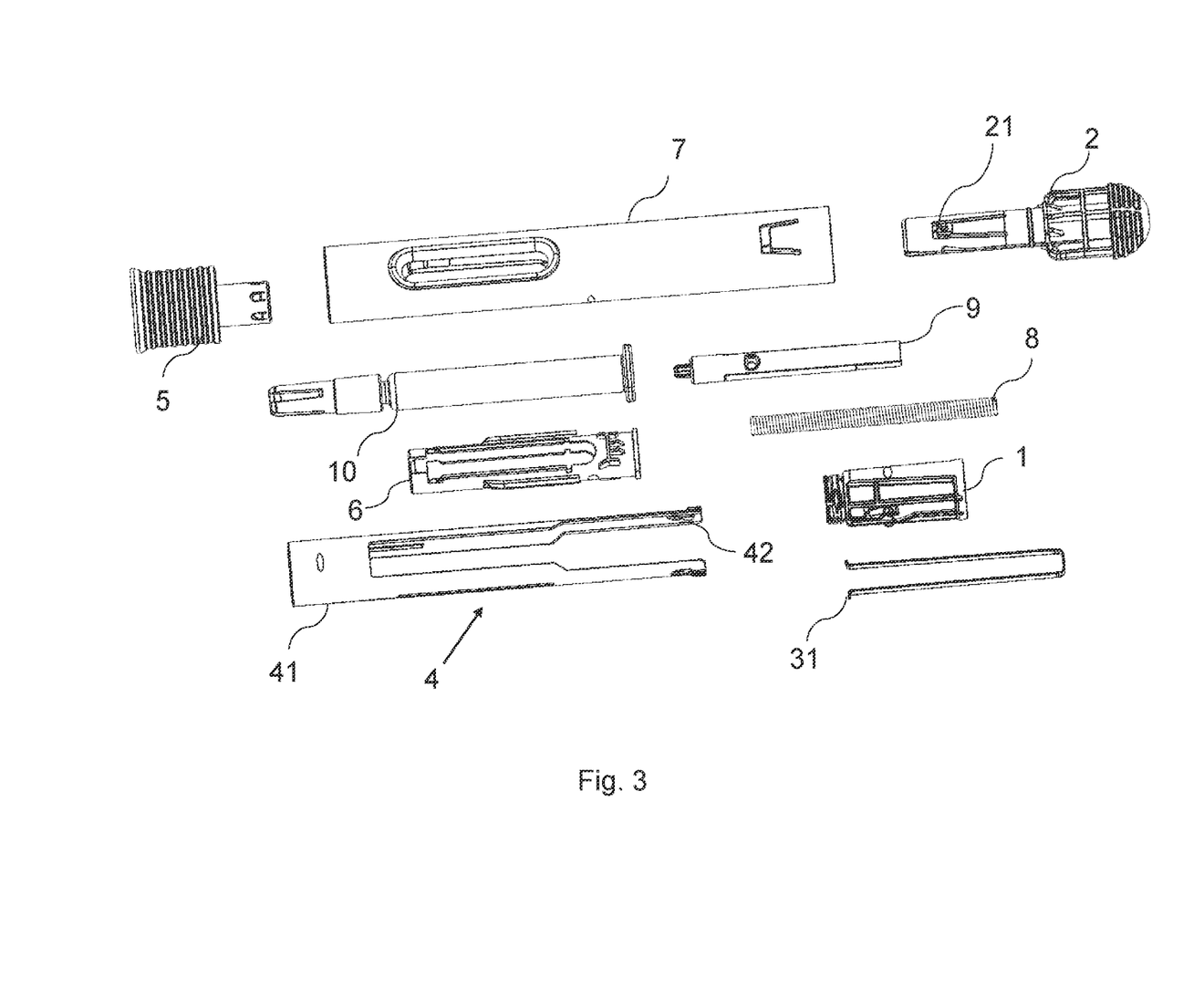
FIG. 3 displays an exploded view of a medicament delivery device with the tubular rotator of FIG. 1.

FIG. 3 illustrates an exploded view of medicament delivery device in the first embodiment comprising the tubular rotator. The medicament delivery device comprises a longitudinally extending housing 7; a protective cap 5 associated with the proximal end of the housing 7; a telescoping delivery member cover 4 axially slidable arranged within the housing; a medicament container carrier 6 arranged to receive a medicament container 10. The medicament container carrier 6 together with the medicament container 10 is axially fixed to the housing 7.

Figure 4:
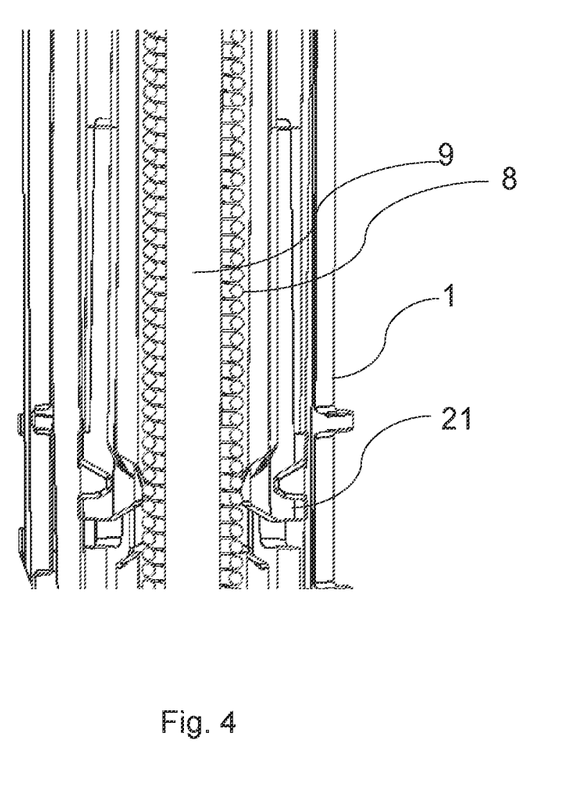
FIG. 4 displays a cross-section view of the medicament delivery device in the first embodiment embodiments.

The medicament delivery device further comprises power pack assembly including: a biased plunger rod 9 comprising an engaging element, preferably a retaining recess on its outer surface; a biasing element 8 configured to bias the biased plunger rod in the proximal direction of the housing 7 to empty a medicament contained in the medicament container 10; a rear cap housing 2 configured with a flexible holding element 21 arranged to engage with the retaining recess of the biased plunger rod 9 against the biasing force from the biasing element 8. As shown in FIG. 4, the tubular rotator 1 is configured to surround the rear cap housing 2, and the retaining wall 15 of the tubular rotator 1 is configured to align with the flexible holding element when the tubular rotator is in a first rotation position, such that the flexible holding element is prevented from flexing out by the retaining wall 15 and the biased plunger rod is thereby prevented from moving proximally in relation to the housing 7.

The delivery member cover 4 of the medicament delivery device comprises a proximal cover element 41 configured to cover a delivery member of the medicament container 10 and a distal guard element 42, preferably a rib or a protrusion. The delivery member cover 4 is preferably rotationally fixed arranged to the housing 7 through a groove and ridge arrangement on outer surface of the delivery member cover 4 and the inner surface of the housing 7. The distal guard element 42 is configured to rest in the guide track 13 of the tubular rotator and axially move along the guide track 13 of the tubular rotator when the delivery member cover axially moves to the distal direction in relation to the housing 7. As seen in FIG. 1, the guide track 13 comprises a cam wall, such that the axially movement of the distal guard element 42 will force the tubular rotator to rotate to a second rotation position through the cam wall. The retaining wall 15 of the tubular rotator is thereby no longer aligned with the flexible holding element of the rear cap housing. The flexible holding element 21 and the retaining recess of the biased plunger rod 9 formed a wedge shape interface, such that once the retaining wall 15 of the tubular rotator 1 is no longer aligned on the outer surface of flexible holding element 21, the flexible holding element 21 will flex out under the biasing force of the biasing element 8 through the wedge shape interface and the biased plunger rod 9 is thereby released and allowed to move in the proximally. The delivery member cover 4 thereby acts as an activation element for the medicament delivery device for activating a medicament delivery operation of the medicament delivery device.

Once the distal guard element 42 turned the tubular rotator 1 to the second rotation position, the distal guard element 42 is positioned distally in relation to the locking tongue 15 of the tubular rotator 1. Therefore, once the delivery member cover 4 is biased to the proximal direction by a delivery cover biasing member (not shown), the distal guard element 42 will thereby pass the locking tongue 15, so that the further distal movement of the delivery member cover 4 is prevented by a cliff surface of the locking tongue and the distal guard element 42.

Figure 5:
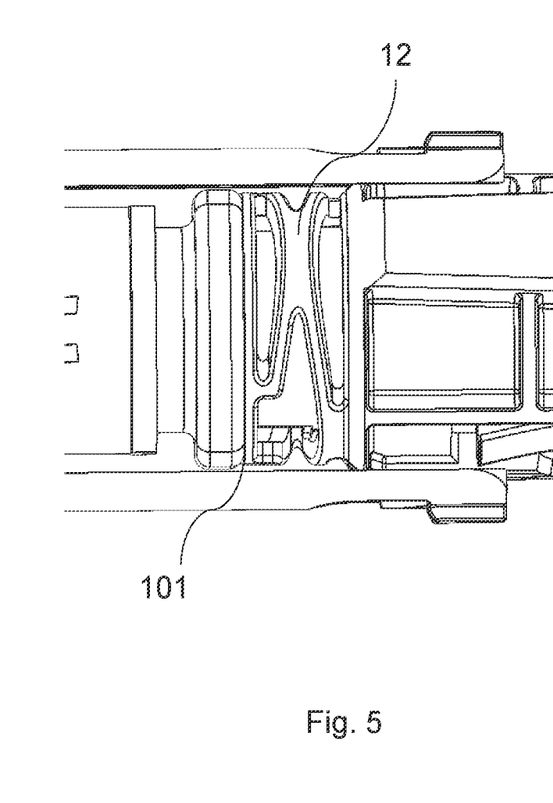
FIG. 5 displays a perspective view of the tubular rotator of the present disclosure abutting a medicament container.

The medicament container 10 is received in the medicament container carrier 6 and rotationally fixed in relation to the housing 7 through another groove and ridge engagement between the inner surface of the housing 7 and the outer surface of the medicament container carrier 6. The tubular resilient structure 12 of the tubular rotator 1 is rotatable in relation to the medicament container 10. The tubular resilient structure 12 comprises a proximal contact surface configured to abut the distal end surface 101 of the medicament container 10 as shown in FIG. 5.

The tubular resilient structure 12 can be formed by a pair of resilient wing gradually extending radially outward to the proximal direction of the medicament delivery device; or be formed with a web shape. The tubular resilient structure 12 is axially and/or radially deformable in relation to the longitudinal axis L.

Since the tubular resilient structure 12 is deformable, the tubular rotator 1 is thereby able to compensate an engineering tolerance of the medicament container 10 or an engineering tolerance while the tubular rotator 1 while assembling the medicament delivery device, such as causing by length difference of the medicament container or the tubular rotator.

The deformation of the tubular resilient structure 12 of the tubular rotator 1 is also arranged to support and secure the axial position of the tubular rotator 1 in relation to the housing 7. The tubular rotator 1 rests on the distal end surface 101 of the medicament container 10 after the medicament delivery device has been assembled. While the distal guard element 42 passes the locking tongue 15 of the tubular rotator 1, the proximal biasing force may transit to the tubular rotator 1 through the temporary engagement between the distal guard element 42 and the locking tongue 15. Such proximal biasing force can be absorbed by the deformation of the tubular resilient structure 12 of the tubular rotator 1, and the tubular resilient structure 12 will axially move the tubular body 11 back to the initial position after the biasing force be no longer transited to the tubular rotator 1.

The medicament delivery device further comprises a longitudinal extending biased feedback element 3. The biased feedback element comprises a resilient longitudinal extending arm extending from the distal end of the biased feedback element to the proximal end of the biased feedback element. The biased feedback element 3 is configured to engage with the biasing element 8 at its distal end and is biased to the distal direction in relation to the housing 7 of the medicament delivery device by the biasing element 8.

Figure 6:
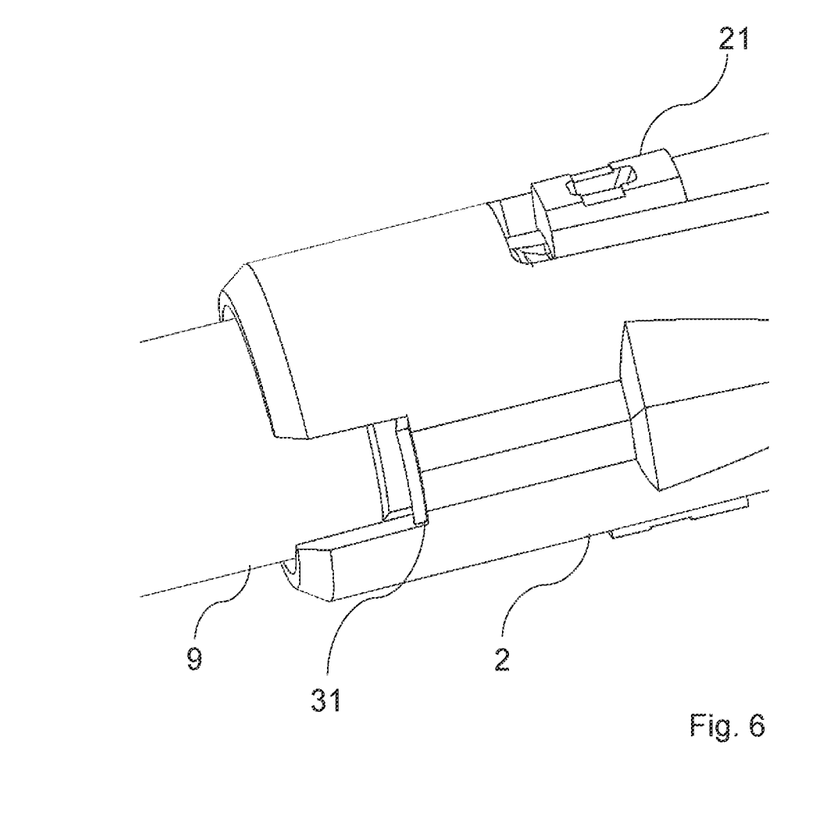
FIG. 6 displays a rear cap housing connected to a plunger rod, and a retaining mechanism of a biased feedback element of the medicament delivery device of FIG. 3 in the first embodiment.

The biased feedback element 3 is arranged between the inner surface of the rear cap housing 2 and the outer surface of the biased plunger rod 9. The biased feedback element 3 comprises a retaining member 31 arranged on the proximal end of the resilient longitudinal extending arm of the biased feedback element 3 configured to engage with an abutment arranged on the proximal end edge of the rear cap housing 2 as shown in FIG. 6. The retaining member 31 is configured to extend radially outward in relation to the abutment, such that the distal axially movement of the feedback element is prevented. In a preferred embodiment, an interface formed between the retaining member 31 of the biased feedback element 3 and the abutment is formed with a predetermined angle in relation to the longitudinal axis L. Such angular interface causes a retaining force exerted by the abutment be divided into a proximally axial dividing force and a radial inward dividing force. Therefore, once the biased plunger rod 9 is released and moved proximally and the outer surface of the biased plunger rod 9 is no longer in contact with the biased feedback element 3, the retaining member 31 of the biased feedback element 3 will be biased inward due to the radial inward dividing force, such that the retaining member 31 is disengaged with the abutment.

The resilient longitudinal extending arm of the biased feedback element 3 may further be modified with a radially biasing pretension force, such that once the biased plunger rod is released and moved proximally and the outer surface of the biased plunger rod 9 is no longer in contact with the biased feedback element 3, the retaining member 31 of the biased feedback element 3 will be biased inward due to the radially biasing pretension force, such that the retaining member 31 is disengaged with the abutment. Such modification may provide another solution for the disengaging mechanism of the retaining member 31 from the abutment.

Once the retaining member 31 is disengaged with the abutment, the biased feedback element 3 is moved to the distal direction of the housing 7 under the biasing force of the biasing element 8 until the biased feedback element 3 hits an inner surface of the rear cap housing 2 or the housing 7 and a feedback is thereby generated. Such feedback may be an audible, tactile feedback or if the rear cap housing 2 or the housing 7 further arranged with an indication window and/or a switch so that a portion of the biased feedback element 3 will then be presented in the window and provide a visual feedback and/or switching on the switch to generate an electronic signal.

Figure 7:
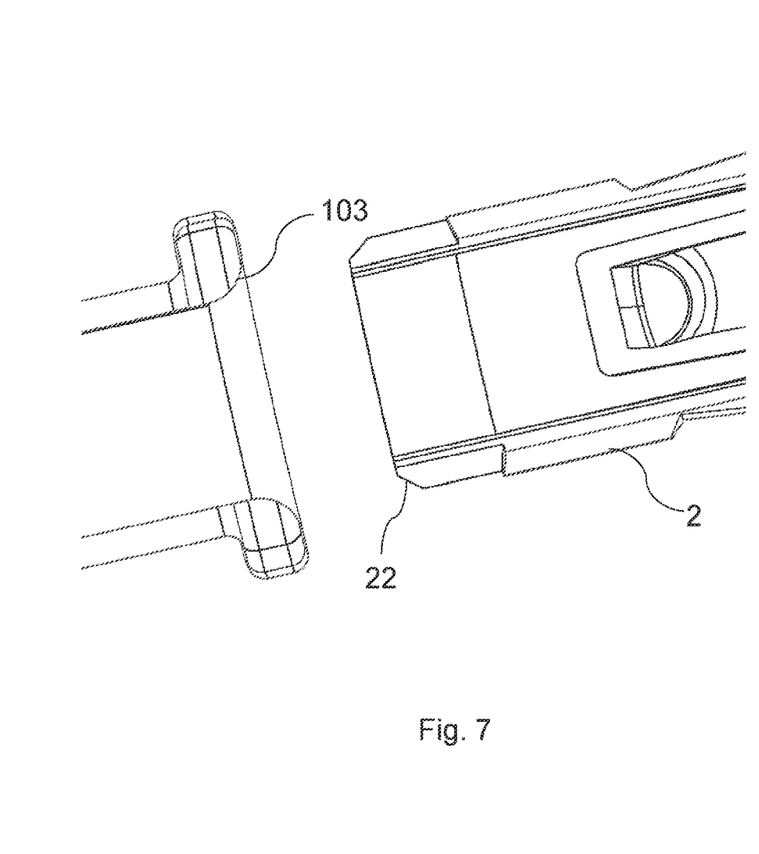
FIG. 7 displays a ramp surface of the rear cap housing in the medicament delivery device in the first embodiment.

The rear cap housing 2 further comprises a ramp surface 22 arranged on the proximal end of the rear cap housing. The ramp surface 22 is configured to match and contact with the distal inner edge 103 of the medicament container 10 as shown in FIG. 7. The contact between the ramp surface and the distal inner edge 103 of the medicament container 10 is configured to align the rear cap housing 2 with the medicament container 10 during the medicament delivery device assembling, especially if the biased plunger rod 9 is distance with the distal end of the medicament container 10 during assembling process.

The ramp surface 22 may also support the medicament container 10 from its inner distal edge, such that rattling of the medicament container in the medicament delivery device is prevented.

Figure 8:
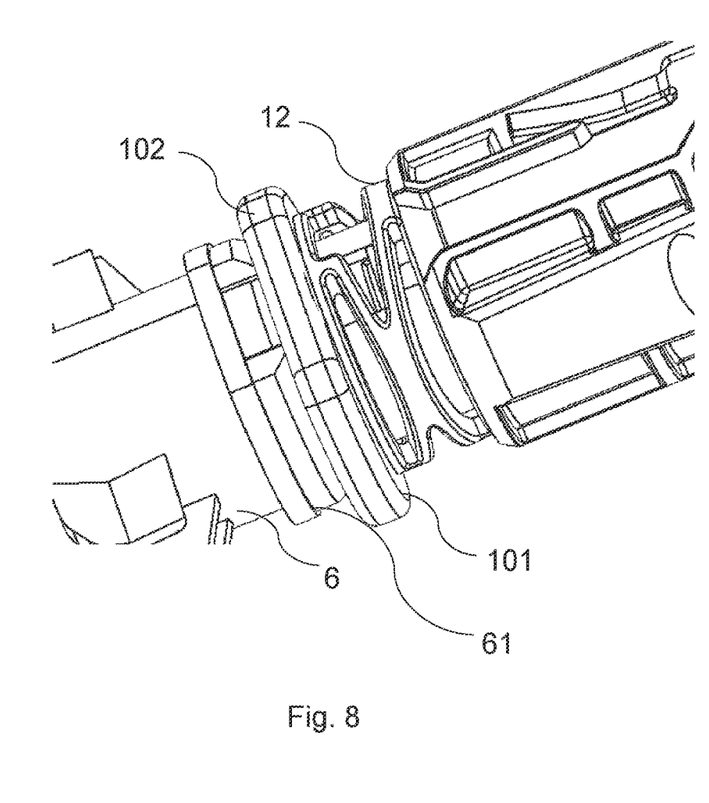
FIG. 8 display a second embodiment of the present disclosure wherein the medicament delivery device comprises damper feature.

In a second embodiment of the medicament delivery device comprising the tubular rotator, the medicament delivery device further comprises a resilient damper feature 61 as shown in FIG. 8. The damper feature 61 can be formed in a ring shape or a C shape. The damper feature 61 is arranged between the distal end of the medicament container carrier 6 and the proximal end of a flange 102 of the medicament container 10.

In the second embodiment, the ramp surface 22 of the rear cap housing 2 is configured to bias on the distal end of the medicament container 10, such that the biasing force causes a deformation of the damper feature 61. In an alternative embodiment, the ramp surface 22 may be removed from the rear cap housing 2, such that the proximal end of the rear cap housing 2 will directly bias on the distal end of the medicament container 10.

The deformation of the damper feature 61 is configured to compensate engineering tolerances of the medicament container 10 during the medicament delivery device assembling. Such as, if the medicament container 10 is longer, the damper feature 61 will be less deformed or not deformed; and if the medicament container 10 is shorter, the damper feature 61 will be much deformed.

In the second embodiment, the tubular resilient structure 12 of the tubular rotator 1 will only configured to compensate the engineering tolerance of the tubular rotator 1 and other components of the medicament delivery device while the tubular rotator 1 is assembled to the medicament delivery device; and support the axial position of the tubular rotator 1 in relation to the housing 1. So that the tubular rotator 1 may apply less force on the medicament container 10 and created less friction in between, thereby be easier to be rotated. The arrangement of this embodiment is preferred to be used in a medicament delivery device with a high stored energy biasing element 8. Since the friction between the retaining wall 15 of the tubular rotator 1 and the flexible holding element of the rear cap housing 2 may be high, the friction between the tubular rotator 1 and the medicament container 10 can arranged be low.

Figure 9:
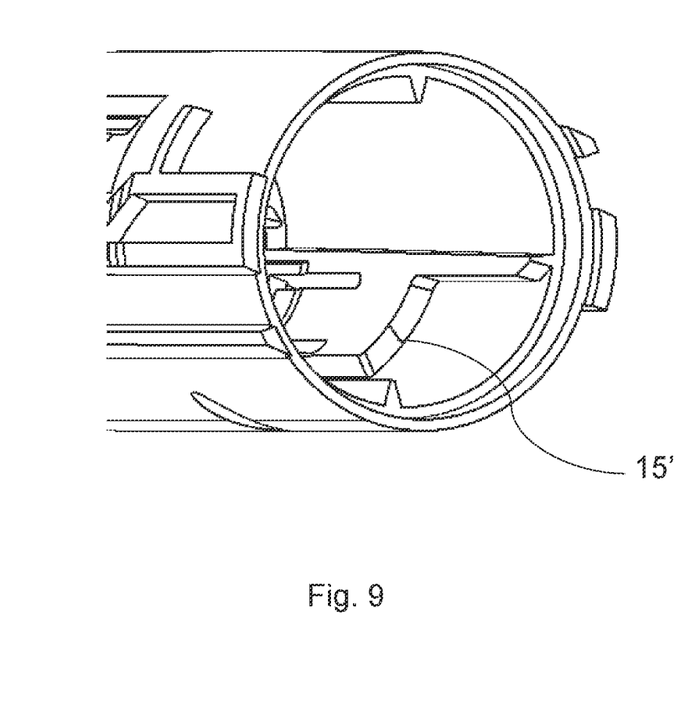
FIG. 9 displays an alternative arrangement of the inner surface of the tubular rotator of FIG. 1 in the first and the second embodiment.
Figure 10:
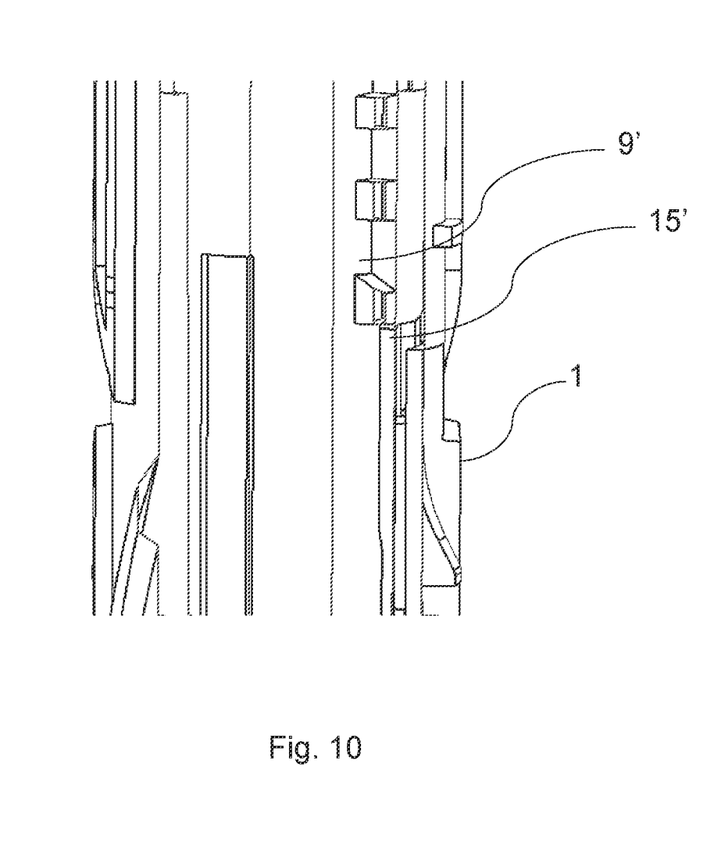
FIG. 10 displays a cross-section view of a medicament delivery device with the tubular rotator with the inner surface arrangement of FIG. 9.

The tubular rotator 1 according to the first and the second embodiments can be further used in a medicament delivery device without the rear cap housing 2. The retaining wall 15 of the tubular rotator 1 in this embodiment will be modified as a retaining ledge 15' as shown in FIG. 9, the engaging element of the biased plunger rod 9 is modified as a radially outward extending retaining wing and is configured to rest on the retaining ledge 15' of the tubular rotator 1 in the first rotation position as shown in FIG. 10. Until the tubular rotator 1 has been rotated to the second rotation position, the retaining ledge 15' is no longer aligned and engage with the retaining wing of the biased plunger rod 9, such that the biased plunger rod 9 is thereby released and allowed to move in the proximally. In an alternative embodiment, the engaging element of the biased plunger rod 9 may also be modified as a retaining groove and the retaining ledge 15' of the tubular rotator 1 may be modified as a retaining protrusion configured to engage with the retaining groove.

Figure 11:
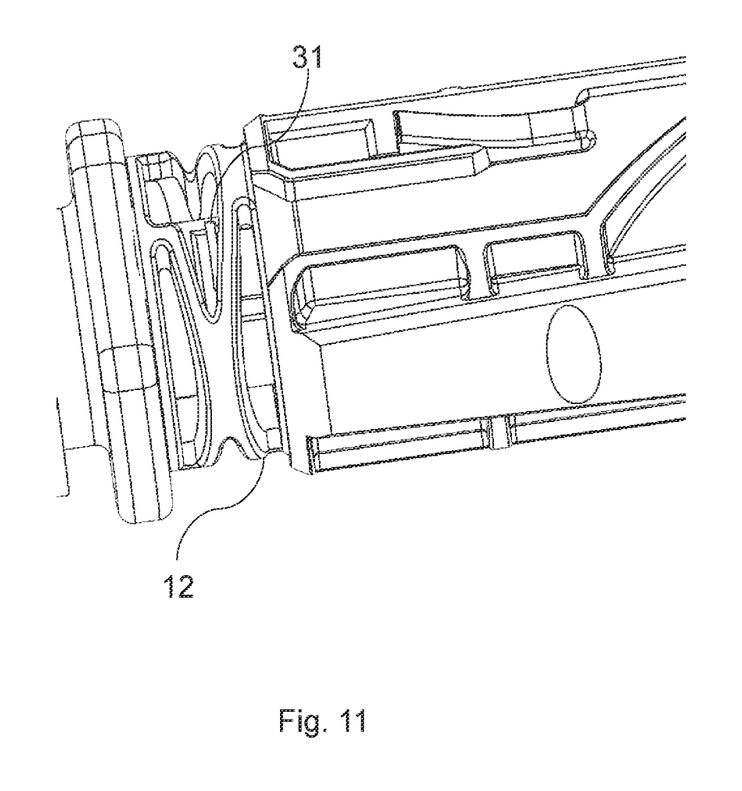
FIG. 11 displays an alternative retaining mechanism of a biased feedback element of the medicament delivery device of FIG. 3 in the first embodiment and the second embodiment.

The tubular rotator 1 according to the first and the second embodiment can be further arranged to retain the biased feedback element 3. The abutment is arranged on the tubular resilient structure 12 as shown in FIG. 11. In this embodiment, the retaining member 31 is configured to disengage with the abutment through the arrangement as described above or disengage with the abutment when the tubular rotator 1 is rotated to the second rotation position. Further, the retaining member 31 of the biased feedback element is configured to axially hold the tubular rotator 1 from moving proximally in relation to the rear cap housing 2 when the tubular rotator is in the first rotation position and before the power pack assembly being assembled to contact with the medicament container 10. This embodiment is also preferred for the medicament delivery device without the rear cap housing 2.

If the medicament container 10 is axially movable arranged in relation to the housing 7, the deformation of the damper feature 61 may also dissipate the impact force applied to the flange 102 of the medicament container 10, so that the damage on the medicament container 10 can be prevented.

The inventive concept has been described above with reference to a few examples. However, as is readily appreciated by a person skilled in the art, other embodiments than the ones disclosed above are equally possible within the scope of the inventive concept, as defined by the appended claims.

The invention claimed is:

1. A tubular rotator for a medicament delivery device, comprising:
   a tubular body extending along a longitudinal axis and having a proximal end and a distal end;
   mechanical members arranged on the outer and inner surface of the tubular body, wherein said mechanical members are configured to co-operate with corresponding mechanical members arranged on other parts of the medicament delivery device; and
   a tubular resilient structure integrally or fixedly arranged to the proximal end of the tubular body, wherein said tubular resilient structure comprises a proximal contact surface configured to abut against a distal end surface of a medicament container arranged in the medicament delivery device, and wherein the tubular resilient structure is configured to either axially deform along a longitudinal axis of the tubular rotator or to radially deform in relation to a longitudinal axis of the tubular rotator, or a combination thereof.

2. The tubular rotator according to claim 1, wherein the tubular rotator is configured to be rotatable in relation to the medicament container.

3. The tubular rotator according claim 1, wherein the deformation of the tubular resilient structure is configured to compensate engineering tolerances of the medicament container during the medicament delivery device assembling.

4. The tubular rotator according to claim 1, wherein the deformation of the tubular resilient structure is configured to dissipate a force exerted on the distal end surface of the medicament container.

5. A medicament delivery device comprising a tubular rotator according to claim 1 and wherein the medicament delivery device further comprises a telescoping delivery member cover which is one of the other parts of the medicament delivery device and wherein the telescoping delivery member cover comprises a distal guide element which is one of the corresponding mechanical members and which is configured to cooperate with the mechanical member arranged on the outer surface of the tubular body; such that a distal axial movement of the telescoping delivery member cover along the longitudinal axis forces the tubular rotator to rotate from a first rotation position to a second rotation position.

6. The medicament delivery device according to claim 5, wherein the medicament delivery device further comprises a biased plunger rod which is one of the other parts of the medicament delivery device and wherein the biased plunger rod comprises an engaging element which is one of the corresponding mechanical members which is configured to be releasably engaged with a mechanical member on the inner surface of the tubular body when the tubular rotator is in the first rotation position, such that an axial movement of the biased plunger rod along the longitudinal axis is prevented.

7. The medicament delivery device according to claim 6, wherein the medicament delivery device further comprises a longitudinal extending biased feedback element associated with the biased plunger rod; wherein the biased feedback element comprises a retaining member associated with an abutment of the tubular resilient structure of the tubular rotator when the tubular rotator is in the first rotation position; such that an axial movement of the biased feedback element in relation to the medicament delivery device is prevented.

8. The medicament delivery device according to claim 7, wherein the biased feedback element is arranged between the inner surface of the tubular rotator and the outer surface of the biased plunger rod; and wherein the retaining member of the biased feedback element is configured to disengage from the tubular resilient structure of the tubular rotator when the outer surface of the biased plunger rod is no longer in contact with the biased feedback element.

9. The medicament delivery device according to claim 7, wherein the abutment of tubular resilient structure of the tubular rotator is configured to disengage from the biased feedback element when the tubular rotator is in the second rotation position.

10. The medicament delivery device according to claim 5, wherein the medicament delivery device further comprises a biased plunger rod and a rear cap housing having a flexible holding element which is associated with the biased plunger rod, and wherein the flexible holding element which is one of the corresponding mechanical members is configured to be releasably engaged with a mechanical member on the inner surface of the tubular body when the tubular rotator is in the first rotation position, such that an axial movement of the biased plunger rod along the longitudinal axis is prevented.

11. The medicament delivery device according to claim 5, wherein the medicament delivery device further comprises a medicament container and a rear cap housing having a ramp surface which is configured to contact with the distal end of the medicament container.

12. The medicament delivery device according to claim 11, wherein the contact between the ramp surface and the distal end of the medicament container is configured to align the rear cap housing with the medicament container during the medicament delivery device assembling and to prevent the medicament container from rattling.

13. The medicament delivery device according to claim 12, wherein the medicament delivery device further comprises a medicament container carrier and a damper element arranged between the medicament container carrier and a flange of the medicament; wherein the ramp surface of the rear cap housing is configured to bias the distal end of the medicament container; such that the damper element is thereby compressed.

14. The tubular rotator according claim 13, wherein the compression of damper element is configured to compensate engineering tolerances of the medicament container during the medicament delivery device assembling.

15. A tubular rotator for use in activating a medicament delivery device having an outer housing, where the rotator comprises:
 a tubular body extending along a longitudinal axis such that it rotates relative to the outer housing, where the tubular body has a proximal end and a distal end;
 a guide track on the outer surface of the tubular body that is engaged with a delivery member cover during activation of the medicament delivery device; and
 a resilient structure connected to the proximal end of the tubular body, where the resilient structure comprises a proximal contact surface that abuts against a distal end surface of a medicament container arranged in the medicament delivery device, and wherein the resilient structure has a first configuration before activation of the medicament delivery device and then is deformed into a second configuration upon completion of medicament delivery from the medicament container.

16. The tubular rotator according to claim 15, wherein during the deformation of the resilient structure a force exerted on the distal end surface of the medicament container is dissipated.

17. The tubular rotator according to claim 15, wherein the resilient structure axially deforms along a longitudinal axis of the tubular rotator or radially deforms relative to the longitudinal axis.

18. The tubular rotator according to claim 15, wherein the resilient structure axially deforms along a longitudinal axis of the tubular rotator and exerts an axial force in a proximal direction against the medicament container to compensate for engineering tolerances resulting from assembly of a medicament delivery device containing the tubular rotator.

* * * * *